United States Patent [19]

Piepho

[11] 4,332,693

[45] Jun. 1, 1982

[54] AGENT FOR THE PURIFICATION OF WASTE WATERS AND PROCESS FOR ITS PRODUCTION

[75] Inventor: Ralf F. Piepho, Wennigsen, Fed. Rep. of Germany

[73] Assignee: American Colloid Company, Skokie, Ill.

[21] Appl. No.: 240,874

[22] Filed: Mar. 5, 1981

Related U.S. Application Data

[63] Continuation of Ser. No. 867,240, Jan. 6, 1978, abandoned.

[51] Int. Cl.$^3$ .............................................. C02F 5/10
[52] U.S. Cl. ..................................... 252/181; 252/84; 210/767
[58] Field of Search .................... 252/181, 84; 210/28, 210/73 W

[56] References Cited

U.S. PATENT DOCUMENTS

3,428,558  2/1969  Murphy ................................ 210/59

Primary Examiner—Mayer Weinblatt
Attorney, Agent, or Firm—Mason, Kolehmainen, Rathburn & Wyss

[57] ABSTRACT

A chemical agent for treating oily emulsions and the like in industrial waste water includes a homogenous mixture of talc; adipic acid; aluminum sulfate; TIXOTON, a registered trademark; a flocculating agent; lime and bentonite. The process for producing the agent involves the steps of introducing the compounds, one at a time, and in the order listed above into a mixing chamber wherein the mixture is vigorously stirred until homogenity is achieved.

6 Claims, No Drawings

AGENT FOR THE PURIFICATION OF WASTE WATERS AND PROCESS FOR ITS PRODUCTION

CROSS REFERENCE TO RELATED APPLICATION

This application is a continuation of Ser. No. 867,240 filed Jan. 6, 1978, now abandoned.

FIELD OF THE INVENTION

This invention relates to a chemical agent for treating waste water and more particularly to a water purification agent for treating and purifying oily waste water and a process for producing the purification agent.

CITATION OF PRIOR ART

Applicant hereby incorporates the following documents as part of the instant Application; U.S. Pat. No. 3,428,558 which teaches the use of polyacrylamide of specified molecular weight as a flocculating agent; German trademark registration Ser. No. 511,874 for "TIXOTON;" the technical pamphlet entitled "TIXOTON ®, ACTIVATED BENTONITE FOR CONSTRUCTION TECHNOLOGY" which sets forth the chemical properties of "TIXOTON;" and *Kirk-Othmer Encyclopedia Of Chemical Technology*, Volume 3, copyright 1964 which discusses "Activated Decolorizing Earths" and (a) at pages 354-355 points out that acid activated bentonites are prepared in Germany and (b) at page 357 states that bentonite is a well-known flocculating agent.

BACKGROUND OF THE INVENTION

A Chemical Agent For The Purification Of Waste Waters And A Process For Its Production The widespread use of oils, fats and waxes in industrial operations, as in motor vehicle technology, in the material-removing treatment of metals in chemical factories, refineries, etc. would lead to considerable environmental damage if the oil-emulsified waste waters were not pretreated to remove a precentage of oil contaminants contained therein.

Numerous procedures have been devised for eliminating harmful substances from waste waters. One such procedure chemically reacts the oily water in monophase or polyphase systems, for example, by combustion or biological degrading (decomposition). This process, however, requires complex reaction installations resulting in considerable expenditures. Furthermore, such methods include gaseous combustion by-products which, themselves, must be eliminated in order to avoid environmental damage.

Another known practice evaporates the water from an oily water emulsion, leaving the substances contained therein in concentrated form, whereby the concentrate may subsequently be deposited or burned in suitable places. The evaporation of the waste waters, however, requires a large amount of energy and is, therefore, economically practical only if a source of free energy is available.

A further method of waste water treatment separates out emulsified oils, fats or other floating substances in the waste water by chemically, thermally, electrically or mechanically decomposing the emulsion and absorbing the precipitated substances.

Yet another process separates out extremely fine dirt particles from the waste water by chemical flocculation and binds the separated dirt particles to a calcium hydrate compound. To accomplish this, iron-II salts, aluminum sulfate in conjunction with calcium hydrate, lime or sodium aluminate in conjunction with activated silicic acid are commonly employed.

The most usual method of treatment splits the emulsion by adding an electrolyte. The electrolyte serves to precipitate the oil, fat or other floating particles, for sedimentation and/or absorption.

These known processes, however, have inherent weaknesses and are not adaptable to all situations. Frequently, the waste water has to be recirculated several times in order to obtain an extensive separation of the oil, fat or other dirt particles. Also, problems often arise in the adsorptive purification of the waste water because of the limited chareability of the adsorption agent or because of the deficient bonding of the oily substance to the absorbing agent, whereby the oily contaminant is again liberated by environmental influences and its harmful effects develop anew.

It is, therefore, one object of the present invention to provide a chemical water treating agent with which the contaminated particles of a waste water solution may be so securely bound that, even in the act of depositing the absorptive chemical agent bonded to the contaminated substances, no liberation of the contaminated particles or other harmful effects proceed to the environment.

Another object of this invention is to provide a process for producing a chemical agent for treating and purifying oily waste water.

Other objects and advantages of the invention will become clear from the following description of a preferred embodiment of the invention.

DETAILED DESCRIPTION OF THE INVENTION

According to the present invention, 87.8 to 120.0 kg of the chemical agent for the treatment of oily waste water is composed of the following compounds in the following proportions:

| Compounds | Range (By Weight) |
| --- | --- |
| Talc | 1.5–2.5 kg |
| Adipic acid | 2.0–3.0 kg |
| Aluminum sulfate | 17–23 kg |
| Tixoton, a registered trademark, an acid activated bentonite having a chemical analysis of $SiO_2$:56.7% $Al_2O_3$:20.2% $CaO$:2.9% $MgO$:4.3% $Na_2O + K_2O$:2.7% and activated by acid treatment of bentonite by contacting the bentonite with a mineral acid heating the acid treated bentonite to a temperature near 100° C. and removing the excess acid | 35–48 kg |
| Flocculating agent, for example a polymer organic compound, such as polyacrylamide | 0.3–0.5 kg |
| Lime ($CaO$ or $Ca(OH)_2$) | 12–15 kg |
| Bentonite | 20–28 kg |

A preferred composition of the chemical agent of this invention per 101 kg is the following:

| Compounds | Weight/101 kg |
| --- | --- |
| Talc | 2 kg |

-continued

| Compounds | Weight/101 kg |
| --- | --- |
| Adipic acid | 2.5 kg |
| Aluminum sulfate | 20 kg |
| Tixatone, a registered trademark, | 42 kg |
| Flocculating Agent | 1 kg |
| Lime | 13.5 kg |
| Bentonite | 20 kg |

The chemical of this invention is prepared by a special process, wherein the order in which the individual compounds of the mixture are introduced for mixing is very important, since random mixing of the individual compounds will not yield an acceptable bonding adsorbent. It is necessary to proceed such that the talc and the adipic acid are first introduced and blended into a homogeneous mixture, whereupon the aluminum sulfate is added and intermixed. The tixoton, a registered trademark, the flocculating agent, the lime and the bentonite are introduced and blended one by one. After each addition, the mixing is accomplished until a uniform homogeneous mixture has been formed wherein the succeeding compound may be supplied. After completing the mixing procedure, the resulting chemical agent is sealed into air tight plastic bags or containers.

The normal, commercial grain size of the individual compounds is essentially fine. For special purposes, however, it is possible to depart from the grain size and a finer or coarser product may be chosen for any or all the ingredients.

In the use of this chemical agent for the cleaning of contaiminated waste water, the waste water and the agent are very thoroughly and vigorously mixed. This is preferably carried out by a "mixing turbine", so that the particles of the mixture according to the invention come intimately in contact with the contaminated particulate contained in the waste water.

The amount of the agent to be added to the waste water to be purified is governed, of course, by the degree of contamination of the waste water and also by the type of contamination.

For a waste water to be purified which contains less than 1% oil, about 2 kg of the agent are used per cubic meter of waste water. If the waste water to be cleaned contains unknown amounts of harmful substances, oil or the like, or in any case more than about 1%, a preliminary test should be conducted to determine the proper proportion of the chemical agent of this invention to be added.

The introduction of contaminated waste water into the chemical agent can take place either continuously or discontinuously. The harmful substances found in the waste water, namely oil, fat, dyestuffs, etc., are added very quickly to the agent so that by filtration or other similar processes they can be separated. The water after separation is fully clear, reacts chemically in the neutral range, and has a pH value of approximately 7.

While one form of the invention has been described, it will be understood that the invention may be utilized in other forms and environments, so that the purpose of the appended claims is to cover all such forms of devices not disclosed but which embody the invention disclosed herein.

What is claimed is:

1. A chemical agent for the treatment of contaminated waste waters, especially of waste waters in the form of oily emulsions, the agent being composed by weight of the following compounds in the following proportions:

| | |
| --- | --- |
| Talc | 1.5–2.5 kg |
| Adipic Acid | 2.0–3.0 kg |
| Aluminum Sulfate | 17.0–23.0 kg |
| An acid activated bentonite, comprising approximately 56.7% $SiO_2$; 20.2% $Al_2O_3$; 2.9% CaO; 4.3% MgO; and 2.7% $Na_2O + K_2O$ | 35.0–48.0 kg |
| A polymeric organic Flocculating Agent | 0.3–0.5 kg |
| Lime | 12.0–15.0 kg |
| Bentonite | 20.0–28.0 kg |
| | 87.8–120.0 |

2. The chemical agent as defined in claim 1 wherein the flocculating agent is polyacrylamide.

3. A chemical agent for the treatment of contaminated waste waters, especially of waste waters in the form of oily emulsions, wherein substantially 101 kg of the agent have the following composition by weight:

| | |
| --- | --- |
| Talc | 2 kg |
| Adipic Acid | 2.5 kg |
| Aluminum Sulfate | 20 kg |
| A bentonite activated by contacting the bentonite with a mineral acid, heating the acid treated bentonite near 100° C. and removing excess acid, said activated bentonite comprising approximately 56.7% $SiO_2$; 20.2% $Al_2O_3$; 2.9% CaO; 4.3% MgO; and 2.7% $Na_2O + K_2O$ | 42 kg |
| A polymeric organic Flocculating Agent | 1 kg |
| Lime | 13.5 kg |
| Bentonite | 20 kg |

4. A process for the production of a chemical agent for the purification of waste waters, the chemical agent comprising talc, adipic acid, aluminum sulfate, a bentonite activated by contacting the bentonite with a mineral acid, heating the acid treated bentonite near 100° C. and removing excess acid, said activated bentonite comprising approximately 56.7% $SiO_2$; 20.0% $Al_2O_3$; 2.9% CaO; 4.3% MgO; and 2.7% $Na_2O + K_2O$, a polymeric organic flocculating agent, lime and bentonite, the process including the steps of:
 (a) introducing the talc and the adipic acid and mixing them into an homogeneous mixture;
 (b) adding the aluminum sulfate to the talc-adipic acid mixture, and mixing until homogeneity is achieved;
 (c) adding said acid activated bentonite to the talc-adipic acid-aluminum sulfate mixture and mixing until homogeneity is achieved;
 (d) adding the polymeric organic flocculating agent to the talc-adipic acid-aluminum sulfate-acid activated bentonite mixture and mixing until homogeneity is achieved;
 (e) adding the lime to the talc-adipic acid-aluminum sulfate-acid activated bentonite-flocculating agent-lime mixture and mixing until homogeneity is acheived.

5. The process of claim 4 wherein the flocculating agent is polyacrylamide.

6. A chemical agent for the treatment of contaminated waste waters, especially of waste waters in the form of oily emulsions, the agent being composed by weight of the following compounds in the following proportions:

| | |
|---|---|
| Talc | 1.5–2.5 kg |
| Adipic Acid | 2.0–3.0 kg |
| Aluminum Sulfate | 17.0–23.0 kg |
| A bentonite activated by contacting the bentonite with a mineral acid, heating the acid treated bentonite and removing excess acid, said activated bentonite comprising approximately 56.7% $SiO_2$; 20.2% $Al_2O_3$; 2.9% CaO; 4.3% MgO; and 2.7% $Na_2O + K_2O$ | 42 kg |
| A polymeric organic Flocculating Agent | 0.3–0.5 kg |
| Lime | 12.0–15.0 kg |
| Bentonite | 20.0–28.0 kg |
| | 87.8–120.0 |

\* \* \* \* \*

UNITED STATES PATENT OFFICE
CERTIFICATE OF CORRECTION

Patent No. 4,332,693            Dated June 1, 1982

Inventor(s) RALF F. PIEPHO

It is certified that error appears in the above-identified patent and that said Letters Patent are hereby corrected as shown below:

On the Cover Page:

Delete "Assignee: American Colloid Company, Skokie, Ill." and substitute therefor --Assignee: Colloid Piepho, Wilmington, Delaware--

Signed and Sealed this

Fourteenth Day of September 1982

[SEAL]

Attest:

Attesting Officer

GERALD J. MOSSINGHOFF

Commissioner of Patents and Trademarks